United States Patent [19]
Koss

[11] Patent Number: 5,176,733
[45] Date of Patent: Jan. 5, 1993

[54] METHOD AND APPARATUS FOR DIRECTED ENERGY GLASS HEATING

[75] Inventor: George A. Koss, Dearborn Heights, Mich.

[73] Assignee: Ford Motor Company, Dearborn, Mich.

[21] Appl. No.: 289,871

[22] Filed: Dec. 27, 1988

[51] Int. Cl.⁵ .......................................... C03B 23/025
[52] U.S. Cl. .................................... 65/107; 65/162; 65/273
[58] Field of Search ................ 65/107, 106, 274, 162, 65/273, 285

[56] References Cited

U.S. PATENT DOCUMENTS

| | | | |
|---|---|---|---|
| 2,967,378 | 10/1961 | Jones et al. | 65/273 |
| 3,068,672 | 12/1962 | Black | 65/268 |
| 3,161,493 | 12/1964 | Golightly et al. | 65/158 |
| 3,257,188 | 6/1966 | Morgan et al. | 65/162 |
| 3,340,037 | 9/1967 | Stevenson | 65/287 |
| 3,356,480 | 12/1967 | Golightly | 65/103 |
| 3,457,055 | 7/1969 | Brewin | 65/106 |
| 3,744,985 | 7/1973 | Peternel | 65/106 X |
| 4,074,996 | 2/1978 | Hagedorn et al. | 65/106 |
| 4,286,980 | 9/1981 | Matsuzaki et al. | 65/106 |
| 4,575,389 | 3/1986 | Halberschmidt et al. | 65/273 |
| 4,711,653 | 12/1987 | Frank et al. | 65/106 |
| 4,726,832 | 2/1988 | Kajii et al. | 65/273 |
| 4,746,348 | 5/1988 | Frank | 65/104 |

FOREIGN PATENT DOCUMENTS

62-171930 7/1987 Japan .
63-085020 4/1988 Japan .

Primary Examiner—Joye L. Woodard
Attorney, Agent, or Firm—Charles H. Ellerbrock; Roger L. May

[57] ABSTRACT

A glass treating apparatus suitable for heating glass sheets, such as in a process of forming motor vehicle windshields, comprises a heater supported by a modular support structure. The heater comprises a non-monoplanar heating surface subdivided into heating zones. The heating zones are individually controlled. The heating surface can approximate the configuration of the glass sheet. The invention allows preferential heating of selected zones of the glass sheet. One or more such modular radiant heater assemblies can be used in a glass forming process.

36 Claims, 6 Drawing Sheets

METHOD AND APPARATUS FOR DIRECTED ENERGY GLASS HEATING

BACKGROUND

1. Introduction

This invention relates to a method and apparatus for bending or otherwise treating glass sheet with directed energy heating It is especially advantageous in the shaping of glass sheet into complex curvo-planar forms, such as for motor vehicle vision units and the like.

2. Background Art

Currently, most mass produced curvo-planar glass sheet products, such as motor vehicle windshields and the like, are formed by a continuous flow gravity bending process. This process employs a large tunnel type furnace or lehr in which the glass is heated to its softening point while being supported only along its periphery by any of various well known types of bending fixtures. In the manufacture of a motor vehicle laminated windshield, for example, the process typically starts with pairs of pre-cut sheets or templets of glass being positioned on a bending fixture, such as a skeleton-type bending fixture comprising hinged "wings" in accordance with designs well known to the skilled of the art. The bending fixture assists in bending the glass sheet, often most sharply on each side proximate the short or "pillar" edges of the windshield. The actual bending of the glass is due to the combination of the force of gravity pulling down the softened glass and the localized mechanical leverage exerted by the hinged wings of the fixture. Each different windshield size and shape usually requires its own uniquely designed bending fixture.

The typical glass sheet heating and bending process can be divided into three distinct phases, each with its own requirements and optimal conditions. In most industrial processes of this type, a series of glass sheets is moved through the three phrases of the process without interruption and at a constant speed. In the first phase, the preheat phase, cold glass sheets are heated from ambient or room temperature to an elevated temperature near the softening point of the glass, typically about 560° Celsius. Often the preheat phase requires between two-thirds and three-quarters of the total heating time. During this phase it is desirable to heat the entire glass volume as uniformly as possible to avoid the creation of large temperature gradients and potentially damaging thermal stresses within the glass.

During the second, most critical phase, the bending phase, the actual bending (and often associated stretching) of the glass sheet takes place. Typically, the required temperature increase over the preheat temperature is only about 50° Celsius. It is well known to those skilled in the art that very close control of the heating rates and duration or residence time of the glass within this phase is required for successful, reproducible glass bending. Thus, for example, for the thin glass sheets (e.g. 1.8 to 2.3 mm) typically used in motor vehicle laminated windshields, the residence time in the bending phase is often a mere 60 to 90 seconds.

In the third phase, the so called annealing phase, the heat resident in the glass sheet is removed in a controlled fashion. The objective generally is to remove the heat uniformly from all areas of the glass to prevent harmful permanent stresses building up in the finished glass product. Ideally, the entire glass volume should "refreeze" at exactly the same point in time. Thus, while refreezing could be achieved within less than 30 seconds of exiting the bending phase, as a practical matter, it is impossible to refreeze the entire glass volume simultaneously and for this reason the cooling process is slowed.

Generally, the heat energy required to soften the glass is generated in the lehr either by electrically powered metal resistance elements, closed gas fired radiant tubes, or open-flame radiant gas burners, all of which are well known to the skilled of the art. These energy sources typically are permanently fixed in various arrays approximately 0.5 to 0.7 meters above the horizontal plane in which the glass sheet moves through the lehr. Occasionally, so called lower side wall heaters or radiant tubes located below the glass movement plane also are used. Due to the wide variety of sizes, bend locations and degrees of curvature required for curvoplanar glass sheet products such as motor vehicle windshields and the like, it is well recognized that the thermal energy required for the heating and bending process is preferably distributed nonuniformly and uniquely for each different product design. This often is accomplished by the use of a number of auxiliary heaters within the lehr which can be moved laterally and/or vertically with respect to the lehr centerline. This relatively simple and economical process, with various modifications, is now in worldwide use in the manufacture of motor vehicle windshields and other vision units. Glass templets, usually in matched pairs, are loaded onto a bending fixture as described above and sent through the lehr oriented such that the vertical centerline of the windshield is parallel to the direction of travel of the glass through the lehr. Continuous flow gravity bending of conventionally shaped windshields is achieved in this way at rates often as high as four to five bent pairs per minute.

The conventional gravity bending technology described above has limitations which make it impractical or inadequate for forming glass sheet products of certain configurations. Complex curvo-planar vision units may have, for example, a deep, abrupt or asymmetric curvature. Such configurations may not be possible using only the force of gravity in the conventional glass bending methods and apparatus described above. Motor vehicle windshield glass, for example, has become progressively thinner and simultaneously larger in vertical and lateral dimensions. This has resulted in difficulties in controlling the final glass form or profile, most notably in areas away from the glass edges supported by the bending fixture. This is believed due at least in large part to an intrinsic feature of current bending process, that is, that the periphery of the glass sheet heats faster and to a higher temperature during the bending process than does the interior of the glass sheet. This is caused by a combination of conductive heat transfer from the metal bending fixture on which the glass sheet is supported, preferential convective heating of the glass edges by the circulation of ambient gases in the lehr, and the more efficient radiant heat absorption by the dense black paint often used on the peripheral areas of windshields. Also, there is the inherently higher radiant heat transfer to any open glass edges and corners. As a result, the sag, that is the surface deformation along and parallel to the vertical windshield centerline, generally must be held to a very low value (i.e., it must be nearly flat) or the deformation will have the general shape of a wide, flat bottomed "U". In extreme cases this can even result in a noticeable reversal of curvature. Such flat spots or reverse curvature areas on an otherwise curved surface are undesirable not only esthetically, but also functionally. In extreme cases, for example, a reverse curvature may result in a windshield wiper bridging over an area and failing to properly clean the glass.

The inherent overheating of peripheral areas of glass sheets in conventional processing in some cases also creates, upon cooling, visually unacceptable wrinkles or "pie crust" configuration along the windshield edges. It also causes the peripheral areas to be softer, resulting in deep tool imprints or "mold marks" in the surface of the glass where contacted by glass bending fixtures or handling tools. Also, the periphery heating problem makes it more difficult to achieve consistent control of final product configuration, especially in the area of the acutely angled corners or "horns" frequently found at the upper corners (i.e., at the pillar roof intersections) of motor vehicle windshields of advanced design.

To date, various attempts to overcome the problems caused by improper heat distribution in the production of curvo-planar glass products have included the placement of heat sinks or "heat robbers" into the glass bending fixture below the glass sheet to function by absorption, shielding or reflection of thermal energy. Another approach has been to shield selected areas of glass from above. Neither of these approaches has proven to be completely satisfactory, since both interfere with the production process and the ease of its operation. Both reduce the efficiency of heat transfer and both may present serious obstacles to automation of fixture loading and unloading. Furthermore, the bending of a glass sheet is fundamentally dependent on the lowering of the viscosity of the glass material by the elevation of temperature and furnace residence time. While slight or modest bends can be achieved at either lower temperature or in shorter time, deep and/or complex bends require either a higher material temperature or a longer bending time. Experience has demonstrated, however, that it is difficult to control product configuration and quality, particularly the avoidance of optical defects, in a conventional process using high temperatures and short bending times.

A particular problem in the production of windshields and other vision units of advanced design involves the occurrence therein of nonparallel bending axes. Where a glass sheet progresses continuously through a conventional bending lehr, in addition to being sag formed by gravity into a generally convex shape, each of its two lateral side areas also may be bent about a bending axis to give the finished windshield product a "wrap-around" effect. Such bending axes, however, typically are generated, as described above, by passing the glass sheet under a source of concentrated heat energy, one on each side in line with the intended location of the bend. It will be apparent as a matter of simple geometry, therefore, that such bend axes will be parallel to each other and to the line of travel of the glass sheet through the bending lehr. Advanced windshield designs, however, call for windshields more narrow at the top. Consequently, their bending axes, rather than being parallel to each other and to the centerline of the lehr, must converge toward each other at the top of the windshield. Using the conventional bending lehr process and apparatus described above, the aforesaid source of concentrated heat energy provided for each intended bend axis might be caused to move progressively toward the lehr centerline in synchrony with the movement of the glass past it. As a matter of process engineering and economics, however, this often is not practical and may not even be feasible. Accordingly, it is a particular object of certain preferred embodiments of this invention to provide a method and apparatus suitable for the production of curvo-planar glass sheet products having converging bend axes.

More generally, it is an object of the present invention to provide a method and apparatus for the treatment of glass sheet in the production of curvo-planar glass sheet products. It is an object of certain preferred embodiments of the invention to provide a method and apparatus capable of producing curvo-planar glass products having good optical quality, even in the case of relatively large products of complex configuration.

The above-stated and other objects of the invention will be better understood from the following disclosure and discussion of the invention, taken in conjunction with the appended drawings.

SUMMARY OF THE INVENTION

According to an apparatus aspect of the present invention, a glass treating apparatus comprises a modular support structure and heater means supported by the support structure for heating substantially curvo-planar glass to convert the glass from a first condition into a second condition, the heater means comprising a multiplanar heating surface subdivided into a plurality of heating zones and control means for controlling individually the heat output provided by each of said heating zones. The modular support structure together with the heater means and, in some cases, part or all of the control means, will be referred to sometimes below as the "modular radiant heater assembly" of the invention. A heating zone of the modular radiant heater assembly provides directed energy for heating a corresponding zone of the glass, i.e., the area of the glass most proximate and directly exposed to it. By individually controlling each of the heating zones, the heating of the corresponding zones of the glass is correspondingly controlled.

According to another apparatus aspect of the invention, a glass treatment station comprises glass support means for at least indirectly supporting substantially curvo-planar glass within the treatment station, a modular support structure mounted within the glass treatment station and heater means supported by the support structure within the treatment station for heating the glass to convert it from a first condition into a different, second condition, the heater means being as described immediately above.

According to another apparatus aspect of the invention, a glass treatment line for converting substantially curvo-planar glass from a first condition into a second condition comprises:

(A) a plurality of glass treatment stations, each comprising
  (a) glass support means for at least indirectly supporting substantially curvo-planar glass within the glass treatment station,
  (b) a modular support structure mounted within the glass treatment station, and
  (c) heater means supported by the modular support structure within the treatment station for heating the glass, such heater means comprising a multiplanar heating surface subdivided into a plurality of heating zones, and (d) control means for controlling individually the heat output provided by each of said heating zones; and (B) means for advancing the glass sequentially from one into another of the glass treatment stations.

According to a method aspect of the invention, substantially curvo-planar glass is treated to convert it from a first condition to a second condition, such method comprising:

(A) providing a glass treatment station comprising a modular support structure mounted within the glass treatment station and heater means supported by the support structure within the glass treatment station for heating the glass, such heater means comprising a multiplanar heating surface subdivided into a plurality of heating zones and control means for controlling individually the heat output provided by each of said heating zones;

(B) positioning the glass on glass support means for supporting the glass;

(C) causing relative movement of the glass support means and the glass treatment station to expose the glass to the heater means in the glass treatment station, at least one of the aforesaid heating zones being energized to provide heating for at least a portion of the time during which the glass is exposed thereto; and (D) causing relative movement of the glass support means and the glass treatment station to terminate exposure of the glass to said heater means.

A number of highly significant advantages inhere in the various aspects of the present invention disclosed above. Some embodiments of the invention overcome problems and deficiencies of the prior technologies while retaining the proven advantages of gravity bending. In one preferred embodiment of the invention, for example, vision units of complex configuration, such as motor vehicle windshields of advanced design, can be produced using conventional three phase (preheating, gravity bending, annealing) processes and equipment such as are currently in use, with substantial modification only of the bending phase. Thus, existing investment in the preheat phase and in the annealing phase can be largely preserved. These portions of the production process may retain continuous glass movement, but a suitable portion of the current bending or forming zone, according to this preferred embodiment, would be converted or modified to comprise one or more modular radiant heater assemblies of the invention. In this phase the continuous mode preferably would be converted to an intermittently indexing mode wherein the glass sheets are moved from one heater means to the next, being stationary for a predetermined dwell time in each station.

A fundamental advantage of the invention is the ability to direct glass heating energy in greater degree to selected zones of the curvo-planar glass sheet being treated. Thus, peripheral areas of the glass sheet can be exposed to less directed energy while central portions of the glass sheet can be exposed to more directed energy. In this way, the inherent tendency of peripheral glass areas to heat faster and to a higher temperature, as discussed above, can be partially or entirely offset of even reversed. Consequently, overheating of peripheral areas of the glass sheet and areas such as "wings" and "horns" at the upper corners of motor vehicle windshields of certain designs can be reduced or eliminated. Greater control over and consistency in the configuration of curvo-planar glass products is thereby achieved and defects such as pie crust edges and mold marks are reduced or avoided.

In addition, the heating zones into which the heater means of the invention are subdivided are easily designed to provide directed energy to selected areas of the glass sheet, such as along parallel or converging bend axes. Moreover, preferential heating of selected areas of the glass sheet can be controlled not only by energizing a properly selected set of the heating zones but also, in certain preferred embodiments, by the selection and control of the degree to which each such heating zone is energized. It will be within the ability of those skilled in the art, in view of the present disclosure, to select a suitable pattern of heating zones into which a heater means of the invention is subdivided, to select appropriate ones of those heating zones to be energized, and to select the heating rate of each such selected heating zone for each particular application. Such selections can be made empirically with minimal trial and error based on simple geometry and familiarity with well known glass processing technology. Thus, for example, a heater means of the invention could be specifically pre-patterned for a particular part or it could be configured more flexibly, i.e., in a general purpose layout.

Another highly significant advantage of the invention inheres in the broad possibilities regarding spatial disposition and orientation of the heating zones. The heater means can be subdivided into a greater number of zones for greater process flexibility or into fewer zones for simplification and cost reduction. The multi-planar heating surface can be given a concave or convex configuration corresponding to even a deeply convex or concave, respectively, configuration of a curvo-planar glass sheet being processed. This would reduce or even largely overcome the heat distribution problems arising in the manufacture of curvo-planar glass sheet products, such as certain larger motor vehicle windshields, having deep bends or "drops", in conventional lehrs due to differences in the distance from the heat source (and, hence, rate of heating) of the bent areas of the glass sheet. While initially, during the preheat phase, a flat horizontal heat source may provide sufficiently uniform heating of a flat glass sheet spaced at some substantially uniform distance from the heat source, once the glass in the bending phase acquires a bent configuration, the distance from a flat heat source and the important angular relation of the heat source to different zones of the glass sheet change rapidly and become nonuniform, as discussed above. The multi-planar heating means of the present invention, however, can be configured to progressively approximate the configuration of the glass at each heating station in the bending phase of the production process. This feature, together with the ability to energize selected heating zone(s) and, in preferred embodiments, to control and select the heating rate at different heating zones, can reduce or eliminate the problems associated with improperly distributed heating. In this regard, it will be possible to accommodate a broad range of windshield shape and size variations with a modest inventory of easily interchangeable or multi-purpose heater means designed and used in accordance with preferred embodiments of the invention.

Yet another advantage, at least in those embodiments discussed further below wherein heating energy is provided by combustion of a flow of combustible fluid through a porous heating element at each heating zone, lies in the ability to direct a flow of noncombustible fluid through the heating element to act as a heat sink or cooling means for selected zones of the glass sheet. According to these embodiments, a single treating apparatus of the invention could be employed both in the heating, bending and controlled annealing of curvo-planar glass sheet product.

These and additional features and advantages of the invention will be further understood from the following disclosure and discussion of preferred embodiments thereof.

BRIEF DESCRIPTION OF THE DRAWINGS

FIG. 5 is an enlarged side elevation corresponding to the plan view of FIG. 4.

FIG. 10 is a diagrammatic perspective view of a glass treating apparatus in accordance with an alternative embodiment of the invention.

DETAILED DESCRIPTION OF PREFERRED EMBODIMENTS

For purposes of illustrating the invention and disclosing a particularly advantageous commercial application of the invention, the discussion which follows refers frequently to a process and apparatus in accordance with the invention for the production of bent glass sheet for motor vehicle windshields having complex configuration. Such process includes the preheating, bending and annealing of matched pairs of glass sheets, although in view of this disclosure it will be recognized by those skilled in the art that single sheets or even sets of three or more sheets could be processed by the method and apparatus of the invention, depending upon the desired product. The preheating and annealing phases may be carried out according to well known technology and involve continuous movement of the glass sheets through the preheating and annealing phases of the lehr. The bending phase, however, as further discussed below, involves stepwise advancement of the glass sheets through a series of bending stations. Each bending station includes a modular radiant heater assembly in accordance with the invention, specifically, a modular support structure mounted within the lehr above the path of travel of the glass sheets. The modular support structure supports a heater means comprising a multi-planar heating surface subdivided into a plurality of individually controlled heating zones.

As used herein, the term "curvo-planar glass sheet" includes the usual flat configuration of a glass sheet prior to bending and also the bent and/or stretched intermediate and final products formed therefrom. The term "modular" in the phrase "modular support structure" or in "modular radiant heater assembly" as used herein means a structure which can be demountably mounted in a glass treatment station as hereinafter more fully described. Preferably a modular support structure, either alone or together with the heater means it supports, is substantially self-supporting when free standing, that is, when demounted from a glass treatment station. The term "non-monoplanar heating surface" used in reference to the heater means of the invention means an exterior heater surface which is not flat, but rather is either smoothly curvo-planar or multi-planar, i.e., comprises a plurality of non-coplanar surface segments. Such surface is adapted to be exposed to a glass sheet which is to be treated thereby, and is subdivided into plurality of heating zones as disclosed above. Thus, the term multi-planar includes those embodiments wherein the different planes are large surface segments at an angle to each other, such as modular radiant heater assemblies 20 and 70 described below, and curvo-planar includes those embodiments wherein the heating surface is smoothly curved or comprises a smoothly curved portion, such as modular radiant heater assembly 60, described below. The heating surface may be either concave or convex. Either a concave or a convex heating surface might be used in a modular radiant heater assembly of the invention which is mounted above or below the glass sheet being treated, depending, in part, on the bending fixture used and the desired form of the glass product. In any case, it will be understood that the heating surface preferably corresponds roughly to the configuration of the curvo-planar glass intermediate product as it is being formed during a bending operation.

The directed energy aspect of the invention involves preferentially heating certain portions of a glass sheet by selectively energizing (or in certain preferred embodiments by controlling the rate of heat output, i.e., the degree of energizing) one or more corresponding heating zones of the heating surface. Radiant heat energy from each such heating zone is directed to the corresponding portion of the glass sheet in greater measure—at least calculated as energy received per unit surface area of the glass sheet—than to other portions of the glass. This may result from a combination of proximity, intensity and angle of incidence. In that regard, the terms "heating" and "rate of heating", i.e. that which is controlled by the control means of the individual heating zones, refer to the heat energy output from a heating zone and not necessarily to the rate at which such energy is absorbed by a corresponding portion of a glass sheet or by the glass sheet overall. While it will be within the skill of the art in view of the present disclosure to employ heating control means which are responsive to the rate at which energy is absorbed by the glass (as by remote sensing of the temperature thereof with feedback to the control means) the control means may, for example, more simply control (either on/off or variably) the flow of electrical power or combustible fluid that is delivered to a particular heating zone and, therefore, the gross amount of heat energy produced at that heating zone.

Figure 1:
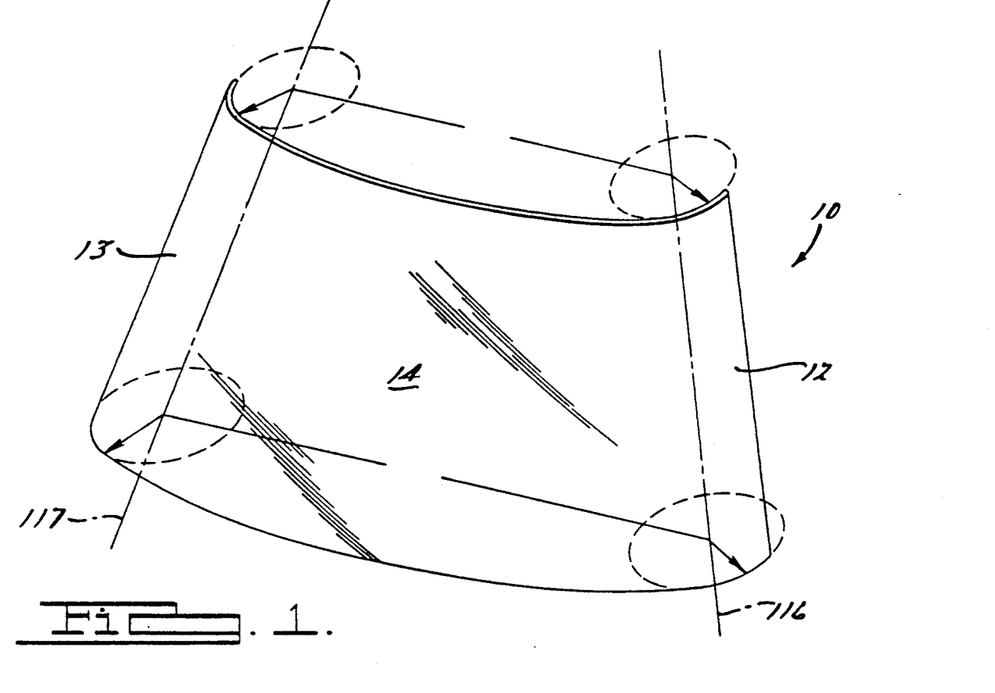
FIG. 1 is a perspective view of a curvo-planar glass sheet product treated in accordance with the method and by the apparatus of the invention, specifically, a motor vehicle windshield of advanced design having a complex configuration, most notably having converging bend axes.

Referring now to the drawings, FIG. 1 is seen to illustrate a curvo-planar vision unit of complex configuration, more specifically a glass sheet bent suitably for a motor vehicle windshield of advanced design. For purposes of a motor vehicle windshield application, vision unit 10 could comprise a pair of matched, nested glass sheets. Typically, a pair of glass templates would be placed on a bending fixture to be bent simultaneously in a bending lehr Vision unit 10 has right and left side "wing" portions 12, 13 which are bent smoothly from center section 14 about bend axes 116 and 117, respectively. Significantly, it can be seen that bend axes 116 and 117 lie in a common plane and converge. That is, at the narrow, top end of the windshield the bend axes are closer to one another than at the wider bottom end. Those skilled in the art will recognize that a fixed heat source in a bending lehr cannot direct concentrated heat energy along such a bend axis while the lass is moved continuously past the heat source, since the bend axes are not parallel with the path of travel of the windshield. (The path of travel typically would be parallel to the bottom-to-top centerline of the windshield.) Such windshield glass can be economically produced with high quality by certain preferred embodiments of the method and apparatus of the present invention.

Figure 2:
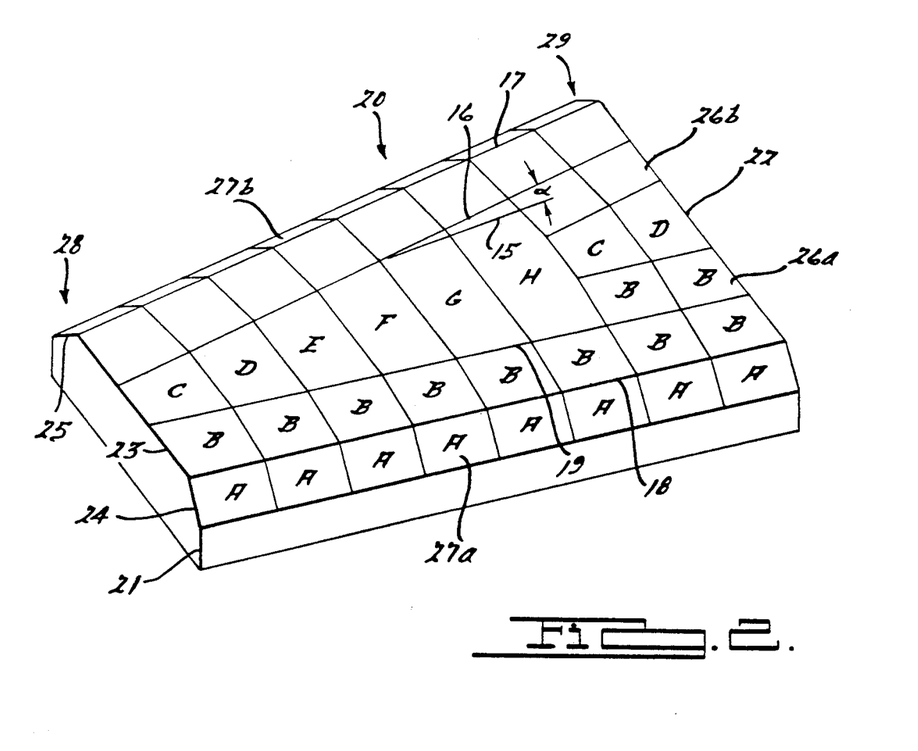
FIG. 2 is a diagrammatic perspective view of a glass treating apparatus, a modular radiant heater assembly in accordance with a preferred embodiment of the invention.

Referring now to FIG. 2, a glass treating apparatus, modular radiant heater assembly 20 suitable for use in a glass sheet bending lehr, is seen to comprise a modular support structure 21 and heater means 22 supported by the support structure. The heater means comprises a multi-planar heating surface. Specifically, a major portion of the heating surface lies in a substantially flat, central, elongate segment 23. Segment 24 of the heating surface also is substantially flat and elongate and lies along a first elongate edge of central segment 23 in a plane which is non-coplanar with that of segment 23. Segment 25 of the heating surface also is substantially flat and elongate and lies in a third plane which is not coplanar with that of either segment 23 or segment 24.

The modular radiant heater assembly 20 is seen to comprise a number of individual surface elements labeled A through H. Each unlabeled surface element in the upper part of FIG. 2 should be taken as being labeled the same as the element in the lower portion with which it is symmetrical.

Each of the "A" elements, of which there are 16 in the entire surface, are substantially identical in size and shape. Likewise, each of the 20 "B" elements are the same. There are two "C" elements and two "D" elements. Finally, there is one each of element sizes "E", "F", "G" and "H". Thus, in total there are 44 elements (e.g. 44 separate tiles, mats, etc.) divided into a total of 8 different sizes. Commonalty of elements provides a significant cost savings in the manufacture of the modular radiant heater assemblies.

As disclosed above, the multi-planar heating surface of the modular radiant heater assembly of the invention is subdivided into a plurality of heating zones. Each such heating zone may comprise one or more of the individual surface elements discussed immediately above. It is frequently the case that a glass sheet product to be heated is symmetrical in shape and the desired heating pattern is correspondingly symmetrical. If this is the case, then individual heating zones of the heating surface may advantageously comprise a first surface element and the symmetrical surface element on the opposite side of the heating surface. Thus, for example, a single heating zone in the modular radiant heater assembly of FIG. 2 for heating the symmetrical windshield glass of FIG. 1 would advantageously comprise surface element 26a and surface element 26b. Likewise, surface element 27a and 27b would together comprise a single heating zone controlled commonly by the control means to provide substantially equal heating, as further discussed below. Accordingly, in total, the modular radiant heater assembly embodiment depicted in FIG. 2 comprises 26 different "circuits", i.e., 26 heating zones, the heat output of each of which is controlled independently of the others by the control means of the modular radiant heater assembly.

It can be seen that modular radiant heater assembly 20 is relatively more convex at narrow end 28 than at wide end 29. The surface of surface section 23 is substantially horizontal. This particularly preferred configuration is advantageous for a number of reasons. Where the overall longitudinal dimension of the modular radiant heater assembly is, for example, 1.8 meters and the lateral dimension at the wide end 29 is, for example, 1.2 meters, the modular radiant heater assembly lends itself quite well to the bending of motor vehicle windshields such as that of FIG. 1. Initially the glass templates, being flat, would be positioned at a relatively greater distance below the heater surface of the burner (the burner of FIG. 2 preferably being mounted above the path of travel of the glass). As the glass is bent into a progressively more concave shape, it would be positioned closer to the modular radiant heater assembly. This could be accomplished by moving the modular radiant heater assembly relative the glass sheet held in fixed position, although this will in most foreseeable applications be more complicated and expensive and therefore less preferred than moving the glass sheet relative fixed-position modular radiant heater assembly-(ies). The glass can be moved either in a stepwise or continual fashion toward the modular radiant heater assembly or, alternatively, in a stepwise fashion from under a modular radiant heater assembly in one heating station to a position closer to the surface of another in a next heating station. This is discussed further below in connection with FIGS. 3-9.

The progressively more convex roof configuration is advantageous in that it can be used to provide directed energy heating for glass sheets in a range of sizes. Larger sheets can be heated under the broader end and smaller sheets can be heated under the narrower, more convex end (or more concave end in an embodiment with a concave heating surface). This matching of the glass based on its size—to an appropriate portion of the heating surface of a modular radiant heater assembly according to certain preferred embodiments of the invention, decreasing the distance between the heating surface and the glass as the glass bends, provides significant advantages, avoiding many of the problems discussed above, such as overheating of windshield "horns", pie crust deformation at the peripheral edge of glass sheets, etc. Also, there is improved control and efficiency of the radiant energy transfer.

It will be apparent to the skilled of the art in view of this disclosure that the modular radiant heater assembly of the invention is suited to the bending, in turn, of a series of single sheets, a series of matched pairs or even higher numbers of sheets, etc. for the production of products including without limitation motor vehicle windshields and the like. In a production line for bending pairs of glass templates for motor vehicle windshields, modular radiant heater assemblies in accordance with the invention can be used in the preheating phase, bending phase, and/or annealing phase. In accordance with preferred embodiments of the invention, however, for economic and complexity reasons, existing preheating and annealing portions of production lines can be retained and modular radiant heater assemblies of the invention substituted only into the bending phase portion of the line. While the modular radiant heater assembly of the invention could be used for heating glass in a press forming operation, this would involve the generally more expensive tooling employed in press forming.

For use in annealing, the modular radiant heater assembly could comprise one or more porous heating surface elements, such as metal fiber mat or porous ceramic, as described below, through which a controlled flow of cooling fluid, such as low temperature air, would be directed to all or appropriate portions of the glass to provide controlled cooling thereof. That is, porous heating elements provide the added option of cooling by eliminating the flow of combustible fuel to the burners while providing or continuing a flow of air or other cooling fluid therethrough to provide a heat sink in selected areas of the glass. In this regard, the ability to apply a variable heat flux to the glass by cycling the fuel/air input to the elements and by varying the distance between the glass and the burner and, of course, by appropriate selection of which zones to energize and to what degree, provides collectively significantly enhanced control over the bending process. Here again, the glass could be held under a single modular radiant heater assembly unit (optionally for both the heating and subsequent cooling) or moved in a stepwise fashion from one to another. Those skilled in the art will appreciate, therefore, that a highly significant advantage of the modular radiant heater assembly of the invention is the ability to provide directed energy as required for controlled heating and, in preferred embodiments, to provide also directed cooling of the glass.

The modular radiant heater assembly can be either electrically powered or gas fired. Each surface element may be one or more individual heating tiles, e.g. refractory tile in which electrical resistance elements are embedded. Alternatively, each may comprise porous sintered metal elements or porous metal fiber mat in the nature of a metal fiber felt or mesh, through which a combustible fluid would be supplied for combustion at the surface of the mat to provide radiant heating. Another alternative material also known to the art and commercially available is a porous ceramic substrate, certain versions of which are available with a metal mesh embedded therein. In this case, again, a combustible fluid would be fed to the heating element to generate radiant heating. Gas fired radiant heating elements operate at significantly higher temperatures than electric resistance heating elements (typically 1900° F. versus 1600° F.). This higher temperature can result in higher furnace efficiencies and production rates. For this reason, gas fired porous heating elements are preferred for the heating surface of the modular radiant heater assemblies of the invention. Porous surface elements energized by providing a flow of combustible fluid such as natural gas could provide a heating rate capability of about 400 kilowatts/$m^2$ radiant heat energy and about 800 kilowatts/$m^2$ nominal total output. Refractory tile heating elements should provide a heating rate of approximately 75 to 125 kilowatts/$m^2$ nominal. Preferably, the control means for an individual heating zone would provide the ability to control the fuel/air flow to individual heater elements with a high turndown ratio, preferably greater than or equal to 4:1. The fuel/air input to the burner or the level of electrical power supply to the heating element optionally is controlled via feedback from an appropriate temperature sensing device measuring the glass temperature at one or more predetermined locations.

A highly significant advantage of the modular radiant heater assembly 20 of FIG. 2 relates to its use in the production of a motor vehicle windshield such as that of FIG. 1 or other curvo-planar glass sheet product having converging bend axes. The longitudinally extending juncture lines between surface segments 23 and 24 and that between segments 23 and 25 are seen to converge toward the longitudinal centerline at the narrow end 28 of the modular radiant heater assembly. Heating zones along one or both sides of the juncture lines can be powered, preferably with variable power level control, to achieve the necessary heating and softening of the glass along the desired bend axes. Heating segments laterally centered on the surface of the modular radiant heater assembly can be independently controlled to provide the degree of bend called for in the center region of the windshield. The skilled of the art will recognize in view of this disclosure that bent glass for such windshield could be produced by first heating a pair of matched glass templates under the wide end 29 of modular radiant heater assembly 20, including preheating or following a separate preheating operation. The glass templates, as they bend, could be moved in a continuous fashion progressively or stepwise closer to the heating surface of the modular radiant heater assembly or by moving it in stepwise fashion to a series of modular radiant heater assemblies. Selection of the heating zones to be actuated and the degree to which each is actuated will be within the skill of the art in view of the present disclosure, using an empirical or trail and error approach based on simple geometry and a knowledge of glass bending technology. Accordingly, complex curvo-planar glass sheet products such as the windshield of FIG. 1 can be produced with curvature along converging bend axes, good curvature in the central region (rather than a flat bottomed U-shape achieved by certain prior art technologies) and without "pie crust" edge deformation or other defects as would often be produced by prior glass bending technologies.

Referring now specifically to FIGS. 3-9, a glass bending lehr 30 is shown schematically to comprise a typical preheating zone 31 followed in line by a glass bending zone 32 followed by an annealing zone 33. The preheating and annealing zones employ rollers 35 to carry glass bending fixtures (to simplify the drawings, only one of the bending fixtures 80 is shown schematically in FIG. 4) on which, for motor vehicle windshield manufacture, matched pairs of glass templates are supported. Preheating and annealing zones and the use of rollers and bending fixtures as just mentioned are well known to the skilled of the art and will not be further described herein.

The glass bending zone 32 of the lehr 30 is seen to be approximately evenly divided into three "directed energy" glass treatment stations 37, 38, 39 in linear sequence in the lehr. Each of these stations comprises a modular radiant heater assembly according to the preferred embodiment described above and illustrated in FIG. 2. Thus, glass treatment station 37 comprises modular radiant heater assembly 20A comprising a multiplanar heating surface of which non-horizontal surface segment 25A (corresponding to surface segment 25 of the modular radiant heater assembly 20 of FIG. 2) can be seen. Correspondingly, station 38 comprises modular radiant heater assembly 20B of which non-horizontal heating surface segment 25B is seen and the third station 39 comprises modular radiant heater assembly 20C of which heating surface segment 25C can be seen. The three stations share a common transport means for advancing glass sheets sequentially from one station to another. Specifically, the transport means comprises a "walking beam" type material transfer mechanism. Glass sheets would advance through the preheat phase of the lehr resting on glass bending fixtures supported on transport rolls as is common in the industry. At the end of the preheat phase "stub rolls" extending laterally from each side wall of the lehr a partial distance toward the centerline of the lehr would support the bending fixtures. The stub rolls may, if necessary, transport the bending fixture a short distance such that it is in proper longitudinal position. That is, depending upon the size of the glass, the stub rolls will transport the fixture such that it is picked up on the proper location on the walking beam and, therefore, deposited under the proper portion (i.e. toward the broader end or the more narrow end) of the modular radiant heater assemblies.

Figure 4:
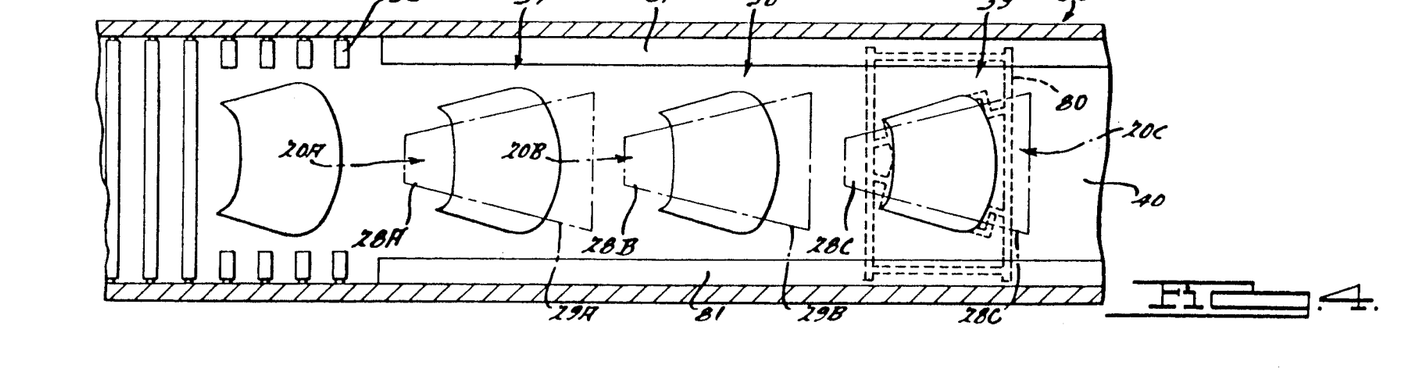
FIG. 4 is an enlarged plan view (certain components having been removed for clarity) of the end of the preheat portion of the glass bending line of FIG. 3 and of the middle portion of the line, that is, the glass bending portion of the line, showing the three treating units partially in phantom, each with an associated intermediate form glass sheet product. The intermediate glass sheet products show a progressively greater degree of bending at each successive station.

The walking beam rises through the gap between the stub rolls 36 on opposite side of the lehr to pick up each bending fixture in turn and move it longitudinally along the lehr to the first glass treatment station 37. A bending fixture 80 is schematically illustrated in FIG. 4 supporting the glass sheet in station 39. There the walking beam drops below the level of the stub rolls, allowing the bending fixture to come down to rest on a suitable support, preferably fixed supports, for example longitudinally extending fixed lateral support means 80, 81 shown in the drawing. The fixed lateral support means 80, 81 are longitudinally extending, horizontal beams or the like fixed to the side walls inside the lehr.

It will be understood that simultaneously with the transfer of a bending fixture from the end of the preheat phase to the first glass treatment station 37, the immediately preceding bending fixture (with, of course, the glass sheets thereon) is being transferred from the first station 37 into the second station 38. Likewise, the next preceding glass bending fixture is being transferred from the second station 38 to the third station 39. The next preceding bending fixture simultaneously is being moved from the third station 39 to the beginning of the annealing phase 33 of the lehr.

After lowering each set of bending fixtures onto the support means, the walking beam reciprocates back toward the preheat phase 31 of the lehr to be positioned for the next transfer. Obviously, the stationary residence time for the glass in each of the three stations would be equal. In a typical glass bending lehr such as that of FIGS. 3-9 for producing matched pairs of curvo-planar glass sheets for motor vehicle windshields, the glass would be held stationary under each of the three stations for a period, depending on glass thickness, color, etc., varying from about 25 to about 35 seconds.

The distance each bending fixture is moved is the same for each cycle. Therefore, the glass will be positioned under the same portion of the heating surface in each station if, as is preferred, the modular radiant heater assembly of each station is spaced from each next one a distance equal to the stroke of the walking beam. The modular radiant heater assemblies of stations 37, 38 and 39 are seen in FIG. 4 to have narrow ends 28A, 28B and 28C, respectively, and wide ends 29A, 29B and 29C, respectively. Thus, in the case of a relatively smaller glass size, in the first station 37 the glass would be deposited by the walking beam under the more convex narrow end 28A of modular radiant heater assembly 20A (corresponding to end 28 of modular radiant heater assembly 20 of FIG. 2). The glass would be accurately positioned under the same portion of the heating surface of the modular radiant heater assembly 20B in station 38 and of modular radiant heater assembly 20C in station 39. Walking beam type material transfer mechanisms are well known to those skilled in the art and will not be further described herein. Also, alternative material transfer mechanisms will be apparent to the skilled of the art in view of the present disclosure and may be used in alternative embodiments of the invention. Of course, as noted above, alternative embodiments of the invention may employ a single glass treatment station with glass moved progressively toward the heating surface. Further embodiments may involve modular radiant heater assemblies of the invention under which curvo-planar glass sheet products are produced without movement of the glass either from burner to burner or relative the heating surface of a single burner.

As the glass bends, it is positioned, in the next station, closer to the heating surface. By decreasing the distance between the glass and the heating surface, a closer match between the curvature of the glass and that of the heating surface can be achieved. The "directed energy" feature of the invention is particularly advantageous at this point in providing greater heating to the critical bend axes areas of the glass. As the wing areas become progressively inclined with respect to the horizontal portion of the heating surface, they receive directed energy from the non-horizontal portions of the heating surface. Also, according to preferred embodiments, where porous heating elements are employed, as noted above, the lateral portions of the heating surface can be converted temporarily to "coolers" by ending the flow of combustible fluid to these elements while maintaining a flow of air or other low temperature fluid.

The positioning of the glass closer to the heating surface of each succesive modular radient heater assembly can be achieved in any of numerous suitable ways which will be apparent to those skilled in the art in view of the present disclosure. A preferred way is to mount each succesive modular radiant heater assembly lower than the preceding one. That is, the heating surface of each (taking the horizontal portion for reference) is lower than the one before. This can be achieved, for example, by increasing the vertical dimension of the support structure of each succesive modular radiant heater assembly. The stub rolls and the support means provided in each heating stations for the bending fixtures on which the glass sheets are supported can in that case all be set at the same height, as in the embodiment illustrated in the drawings.

As noted above, the major bend axes in the wings of a motor vehicle windshield such as that of FIG. 1 are in some cases parallel to each other and in others converge, being at an angle to the centerline of as much as 15° each. In the modular radiant heater assemblies 20A, 20B and 20C the longitudinal juncture lines between laterally adjacent heating surface elements (porous metal fiber mats, porous ceramic, electrical heating tiles, etc.), including the juncture lines between the different planar segments of the heating surface, are correspondingly angled toward the longitudinal centerline. For a general purpose "flexible" modular radiant heater assembly design, the angle alpha (indicated in FIG. 2) between each of the longitudinally extending juncture lines 16–19 and the longitudinal centerline or direction of travel 15 is preferably between about 7° and 13°, more preferably between 7.5° and 12.5°, most preferably about 10°. Controlled actuation of heating elements along juncture lines corresponding to the major bend axes in the curvo-planar glass product provides excellent control of the bending process and can reduce or entirely avoid undesirable overheating effects such as described above.

Figure 6:
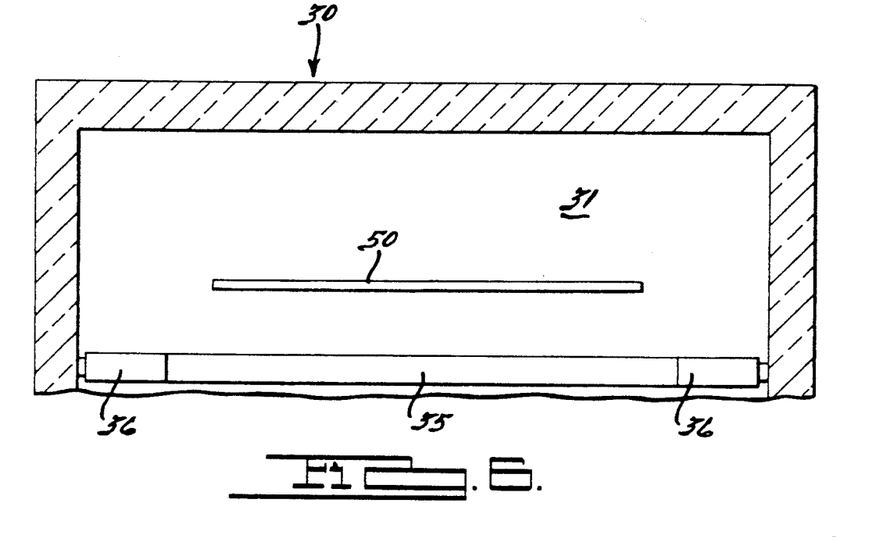
FIGS. 6 through 9 are section views: one of the end of the preheat portion of the line and one each of the three glass treatment stations of FIGS. 4 and 5. The views are normal to the path of travel of the glass sheets along the line and show the progressively more deeply concave configuration of the glass sheets and the correspondingly smaller vertical spacing between the glass and the overhead heating apparatus under which the glass sheet is positioned. Means for energizing the various heating zones are shown schematically.
Figure 7:
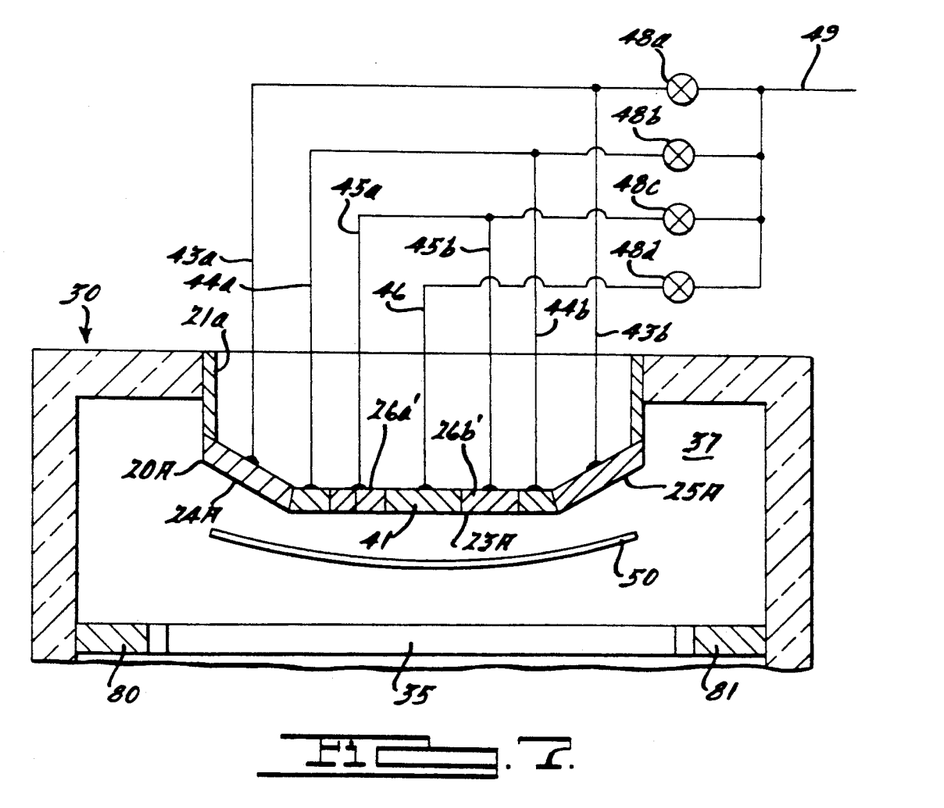

As seen in FIG. 6, curvo-planar glass sheets 50 arrive at the end of the preheating phase 31 still substantially flat. Following the predetermined dwell time in the first glass treatment station 37 in the bending phase 32 of the lehr, as seen in FIG. 7, the glass sheets 50 have been sufficiently softened to begin bending under the force of gravity. It can be seen that modular radiant heater assembly 20A comprises a modular support structure 21A and a multi-planar heating surface subdivided into a plurality of heating zones. Thus, a first zone seen in the cross-section of FIG. 7 comprises a heating element in non-horizontal segment 24A and a second heating element (not contiguous to the first) in non-horizontal surface segment 25A. A second heating zone comprises the two outside elements in planar surface segment 23A. A third heating zone comprises heating elements 26a' and 26b' corresponding in size, position, orientation, etc. to elements 26a and 26b of modular radiant heater assembly 20 of FIG. 2. A further, separately controlled heating zone comprises the laterally centered heating element 41. The control means for separately controlling the heat output provided by each of the heating zones is shown schematically. Supply lines 43a and 43b supply the first aforesaid heating zone comprising elements 24A and 25A. Supply lines 44a and 44b supply the second heating zone. Supply lines 45a and 45b supply the third heating zone consisting of heating element 26a' and 26b' and, finally, supply line 46 supplies the single element heating zone 41. It will be apparent that a similar set of supply lines would supply each of the heating zones longitudinally forward of those depicted in FIG. 7.

The supply lines may either be electrical supply lines, in which case the control fixtures 48a, 48b, 48c and 48d preferably would comprise controls for variable electrical power to be supplied to the heating surface, whereby the level of radiant heat output provided by each heating zone of the heating surface could be variably controlled. Lead 49 would in that case extend to a source of electrical power. In the case of modular radiant heater assemblies powered by combustible fluid, each of the aforesaid supply lines would comprise a conduit for communicating a flow of combustible fluid to porous heating elements, such as porous metal fiber mat, porous ceramic or porous sintered metal elements, etc. In that case, control fixtures 48a, 48b, 48c and 48d would comprise open/closed valving or, more preferably, variable flow control valving and the energy supply would be a source of pressurized combustible fluid fed through common conduit 49.

Figure 3:
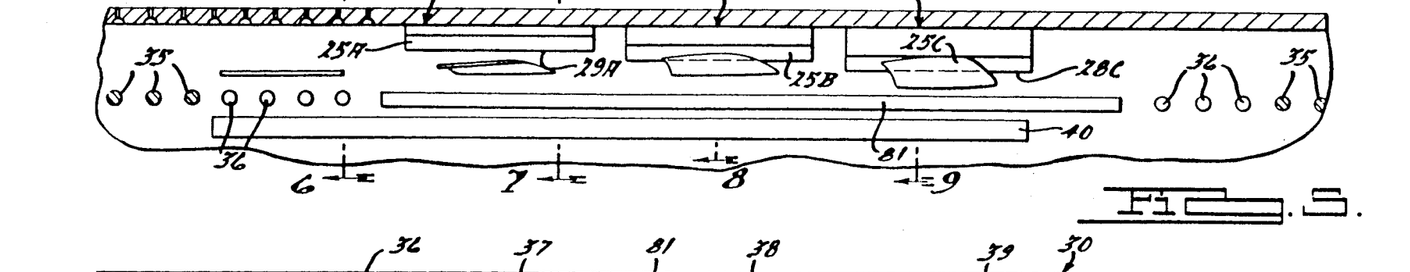
FIG. 3 is a diagrammatic cross-section view of a curvo-planar glass sheet product processing line suitable for production of curvo-planar glass sheets (single sheets, matched pairs, etc.) for motor vehicle windshields such as that of FIG. 1, which line employs three glass treating units, i.e., three modular radiant heater assemblies of the embodiment shown in FIG. 2.
Figure 8:
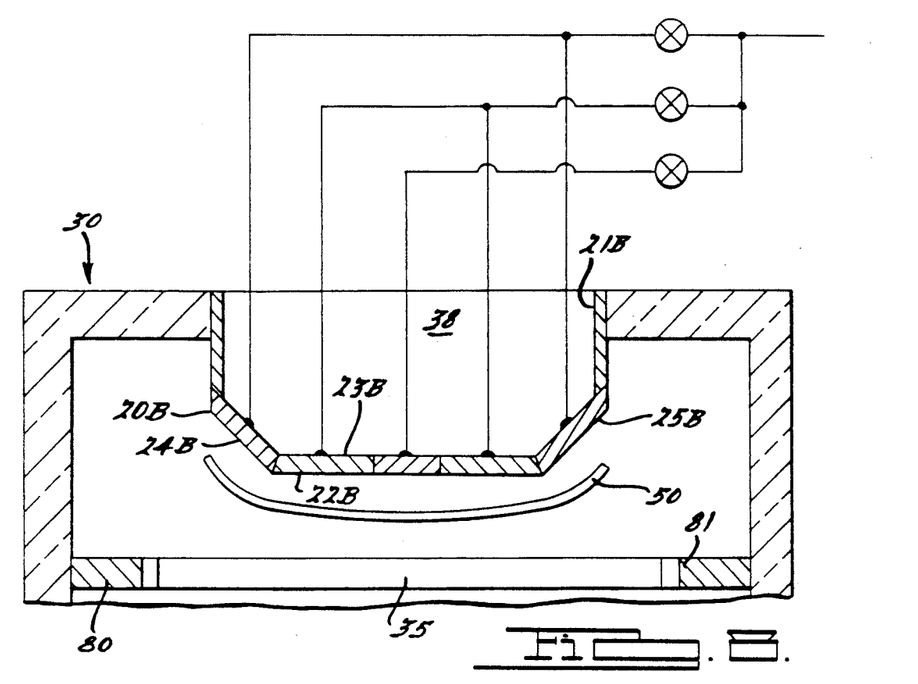

The glass sheets 50 are picked up by walking beam 40, as illustrated schematically in FIGS. 3 and 5, and transported after the preselected dwell time from the first glass treatment station 37 to the second glass treatment station 38. Referring to FIG. 8, in station 38 the glass sheets 50 are further bent. The heating surface 22B of the modular radiant heater assembly 20B is closer to the glass. That is, the modular radiant heater assembly in station 38 having been mounted suitably lower than the one in station 37, the vertical spacing between the glass sheets 50 and the heating surface is somewhat less than it was in the first station 37. The heating surfaces of modular radiant heater assembly 20B are seen to be subdivided into a plurality of heating zones, some of which consist of multiple separate, but commonly controlled, heating elements As noted above, modular radiant heater assembly 20B preferably is substantially the same as modular radiant heater assembly 20A of the first station 37, as is modular radiant heater assembly 20C of the third station 39. Hence, the means for energy supply to each and the means for control of the energy supply would follow the principles described above in connection with modular radiant heater assembly 20A and will not be further discussed here.

Figure 9:
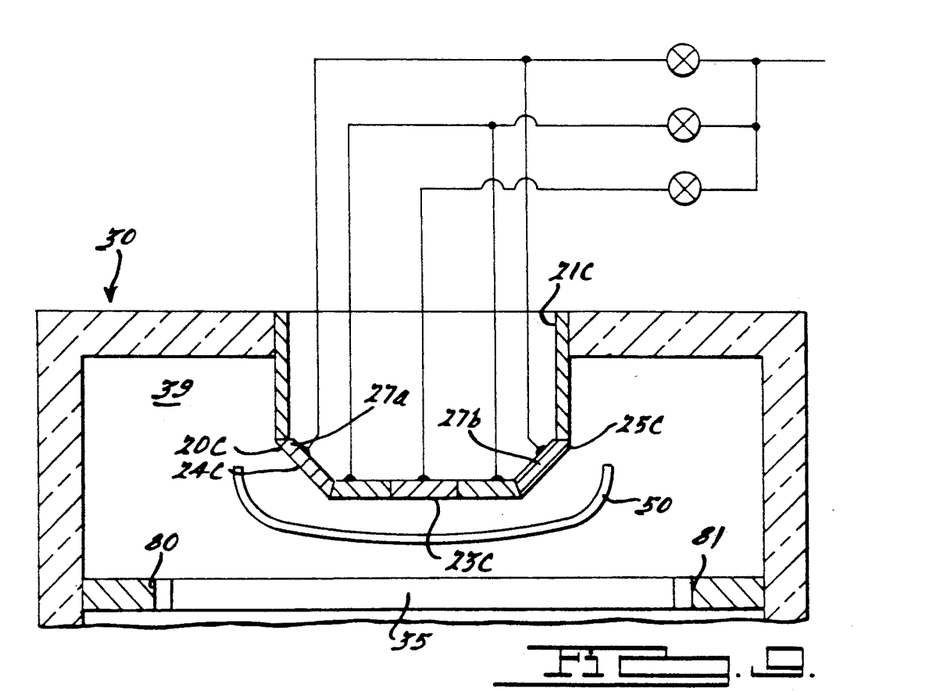

Following the preselected dwell time the walking beam 40 lifts the glass bending fixture with glass 50 supported thereon from fixed support means 80, 81 in glass treatment station 38 and transports it to station 39 wherein it is lowered again onto the fixed supports. Referring specifically to FIG. 9, the glass sheets 50 obtain substantially their final configuration in the third station 39. As discussed above, the modular support structure of modular radiant heater assembly 20C is larger vertically, such that the heater surface in station 39 is lower than the one in station 38. Thus, the walking beam positions the glass sheets under it at a distance less than that between the glass and the heating surface in station 38. The convex heating approximately matches the concave configuration of the glass. The walking beam then lifts and transports the bending fixture with glass sheets 50 thereon from the fixed supports 80, 81 in station 39 and transport it forward onto stub rolls 36 at the beginning of annealing phase 33 of the lehr 30. The glass then is annealed according to techniques well known to the skilled of the art and exits the downstream end 311 of the lehr for subsequent processing, assembly, etc.

It generally will be preferred to maintain only the appropriate set of heating zones in each of the glass treatment stations 37, 38 and 39 energized continually during production of any particular size and shape glass sheets. In certain applications, however, it may be preferred to intermittently energize or actuate certain of the heating zones at each station. It is even possible in certain applications that the desired set of heating zones to be actuated in each cycle will change from time to time, such as where a mix of glass sheet products is being produced on a single line.

The windshield glass bending line described above presents certain particularly preferred and advantageous embodiments of various aspects of the invention. It is an improved glass gravity bending apparatus which combines the economic advantages of uninterrupted material flow during preheat and annealing with directed energy bending of stationary glass by using intermittent, step-wise advancement of the glass through the bending phase. The modular radiant heat burners, being all of a common design, can be relatively economical to manufacture. Since the heating surface is subdivided into a large number of fairly small heating zones, the modular units are "flexible", i.e., they can provide the appropriate directed energy for many different glass sheet product sizes and bending patterns. The use of a "walking beam" type transport means to advance the glass sheets through the bending phase is particularly advantageous in view of the cost-effective accuracy it provides in positioning the sheets under the modular radiant heater assemblies. The net result is improved windshield glass (and other curvo-planar glass products) in configurations, some of which previously could not be consistently and economically produced (if producible at all) by gravity bend techniques. Product forms and shapes having deep and smoothly arcuate or curved bend profiles (in contrast to "flat bottomed U" shapes of the prior art) can be produced. Windshield quality glass with deep wings, even when bent along converging bend axes, are economically, technically and commercially feasible.

Referring now to FIG. 10, an alternative embodiment of the invention is seen in modular radiant heater assembly 60 comprising an end wall 61 and a heating surface 62 which has a smoothly curvo-planar configuration. Such heating surface preferably is substantially a circumferential portion of a truncated cone or such other configuration as would closely parallel the curvature of a curvo-planar glass sheet product to be produced using such modular radiant heater assembly. It will be recognized that using such smoothly curved surface could provide a nearly uniform spacing between the heating surface and the surface of the glass sheet. The cost of construction of such a modular radiant heater assembly, however, generally would be greater than that of a modular radiant heater assembly comprising flat heating elements, such as the embodiment of FIG. 2. In the modular radiant heater assembly 60 of FIG. 10 the individual heating elements 63, 64, etc are curved rather than flat, and both design and construction of such elements would in most cases be more complex and costly than the corresponding flat elements of modular radiant heater assembly 20. Control means for controlling the heat output provided by the heating zones of the modular radiant heater assembly 60 are provided in accordance with the principles, as illustrated in FIG. 12 discussed above for modular radiant heater assembly 20 and the use of the modular radiant heater assembly 60 would similarly follow the same principles.

Figure 11:
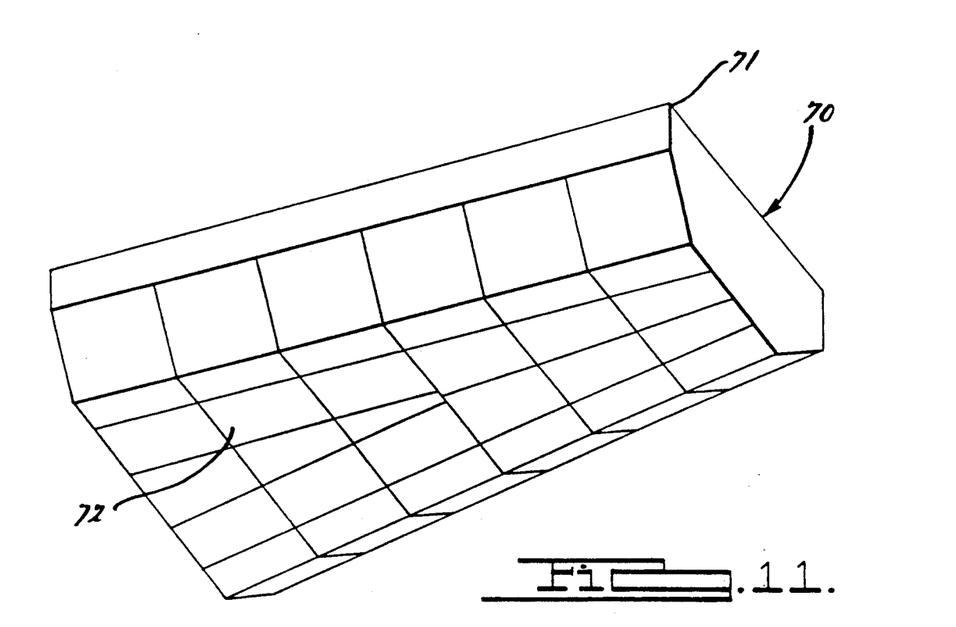
FIG. 11 is a diagrammatic perspective view of a glass treating apparatus in accordance with another alternative embodiment of the invention.

Shown in FIG. 11 is another embodiment of the modular radiant heater assembly of the invention. Specifically, modular radiant heater assembly 70 is seen to comprise a support structure 71 and a multi-planar heating surface 72 subdivided into a plurality of heating elements. The separate heating elements, singly or in groups, form separately controlled heating zones in accordance with the principles discussed above. The heating surface 72 of the modular radiant heater assembly is subdivided into only 39 flat heating elements. This is fewer than were used in modular radiant heater assembly 20 of FIG. 2 and, accordingly, modular radiant heater assembly 70 could be more economically produced. The surface design, however, is less flexible in that it is suitable for production of curvo-planar glass sheet products within a smaller range of configurations. It will be recognized, in view of the present disclosure, however, that it may be economical or even necessary to produce modular radiant heater assemblies of unique design for any given application, rather than employing a modular radiant heater assembly of more general, flexible design.

Optionally, the angle between planar surface segments of the modular radiant heater assembly may be variable, with either mechanized or manual control. This would render the modular radiant heater assembly more flexible and, hence, useful for production of a wider range of curvo-planar glass sheet product configurations. The incremental cost and complexity of such feature, however, must be considered against the increased productivity which may be achieved.

Figure 12:
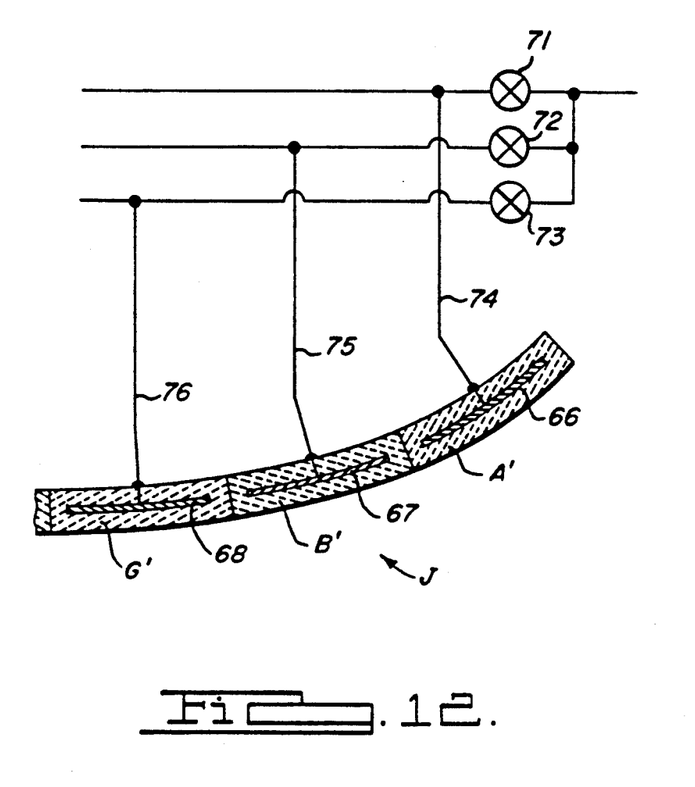
FIG. 12 is a schematic cross-sectional view of portion J of the modular radiant heater assembly of FIG. 10, turned over and enlarged to show detail, wherein the heating surface is illustrated as comprising refractory tiles with electrical heating elements embedded therein.

Referring now to FIG. 12, an enlarged portion J of the radiant heater assembly 60 of FIG. 2 is illustrated (in upside-down orientation relative FIG. 2) in accordance with one preferred embodiment of the invention wherein the heating surface comprises refractory tiles A', B' and G' (corresponding generally to elements A, B and G, respectively, of FIG. 2) with electrical heating elements 66, 67 and 68 embedded in the tiles A', B' and G', respectively. Electrical control means 71, 72 and 73 are provided in electrical lines 74, 75 and 76, respectively, for controlling the flow of electrical power through said electrical heating elements 66, 67 and 68, respectively.

While particular preferred embodiments have been discussed and illustrated, these embodiments are illustrative and exemplary only and are not intended to limit the principles or scope of the present invention as defined in the appended claims. Thus, for example, the modular multi-planar burner of the invention could be used in conjunction with press forming as well as gravity bending, as will be apparent to the skilled of the art in view of the above disclosure. The size and layout of the modular radiant heater assembly can be varied. It could be specifically patterned for a particular part or it could be configured in a general purpose layout. It will be apparent that the economy of scale would make less expensive the production of a large number of general purpose modular radiant heater assemblies in contrast to production of one or a small number of modular radiant heater assemblies in each of many different designs, shapes, etc. Other modifications will be apparent which also are within the scope of the appended claims.

We claim:

1. A glass treating apparatus comprising a modular support structure and heater means supported by said support structure for heating glass sheet to convert said glass sheet from a first condition into a second condition, said heater means comprising a multi-planar heating surface subdivided into a plurality of heating zones and control means for controlling individually the heat output provided by each of said heating zones.

2. The glass treating apparatus of claim 1 wherein said control means is an on/off control means, each said heating zone having a single heat generating state.

3. The glass treating apparatus of claim 1 wherein said control means is a step variable control means, each said heating zone having multiple heat generating states.

4. The glass treating apparatus of claim 1 wherein said control means is a continuously variable control means, the heat output provided by each said heating zone being continuously variable within a preselected range.

5. The glass treating apparatus of claim 1 wherein said control means controls all heat output provided by said glass treating apparatus.

6. The glass treating apparatus of claim 1 wherein said heat surface has a longitudinal center line and a substantially horizontal and longitudinally extending juncture between laterally adjacent heating zones is nonparallel to said longitudinal center line.

7. The glass treating apparatus of claim 1 wherein said heating surface has a longitudinal center line and all longitudinally extending juncture lines between laterally adjacent heating zones are nonparallel to said longitudinal center line.

8. The glass treating apparatus of claim 7 wherein the angle between each said juncture line and said centerline in each case is between about 7 and 13 degrees.

9. The glass treating apparatus of claim 1 wherein said heating surface comprises a porous metal fiber mat and said heater means further comprises conduit means for supplying a flow of combustible fluid to said mat, and wherein said control means comprises flow control means for controlling the flow of said combustible fluid through said conduit means.

10. The glass treating apparatus of claim 9 further comprising cooling means for providing a flow of a noncombustible fluid through at least one of said heating zones toward said glass sheet for selectively cooling at least a corresponding zone of said glass sheet.

11. The glass treating apparatus of claim 9 wherein said flow control means comprises means for continuously varying the rate of flow of said combustible fluid.

12. The glass treating apparatus of claim 1 wherein said heating surface comprises multiple refractory tiles having electrical heating elements embedded therein and said control means comprises means for controlling the flow of electrical power through said electrical heating elements.

13. The glass treating apparatus of claim 1 wherein said heating surface comprises multiple porous ceramic elements and said heater means further comprises conduit means for supplying a flow of combustible fluid to said ceramic elements.

14. The glass treating apparatus of claim 1 wherein said heating surface comprises multiple porous sintered metal elements and said modular support structure further comprises conduit means for supplying a flow of combustible fluid to said porous elements.

15. The glass treating apparatus of claim 1 wherein each of said heating zones individually is substantially flat.

16. The glass treating apparatus of claim 1 wherein at least one of said heating zones is discontinuous, comprising multiple separate areas of said heating surface, the rate of heating of said separate areas of said heating zone being controlled commonly by said control means.

17. The glass treating apparatus of claim 1 wherein said multi-planar heating surface comprises at least three substantially flat, non-coplanar surface segments including (a) a central elongate segment, and (b) a pair of elongate side segments, one on either elongate side of said central elongate segment.

18. The glass treating apparatus of claim 17 wherein the lateral dimension of said central elongate segment diminishes toward one end of said heating surface and the longitudinal centerline of each said side elongate segments converge toward one another toward said one end.

19. A glass treatment station comprising glass support means for at least indirectly supporting a glass sheet within said treatment station, a modular support structure mounted within said glass treatment station and heater means supported by said support structure within said treatment station for heating said glass sheet, said heater means comprising a multi-planar heating surface subdivided into a plurality of heating zones and control means for controlling individually the heat output provided by each of said heating zones.

20. A glass treatment line for converting a glass sheet from a first condition into a second condition, said line comprising:
(A) a plurality of glass treatment stations, each comprising (a) glass support means for at least indirectly supporting said glass sheet within said station, (b) a modular support structure mounted within said glass treatment station, and (c) heater means supported by said support structure within said glass treatment station for heating said glass sheet, each said heater means comprising a multi-planar heating surface subdivided into a plurality of heating zones and control means for controlling independently of each other the heat output provided by each of said heating zones; and
(B) transport means for advancing said glass sheet sequentially from one into another of said plurality of glass treatment stations.

21. A method of treating a glass sheet to convert said glass sheet from a first condition into a second condition, said method comprising:
(A) providing a glass treatment station comprising a modular support structure mounted within said glass treatment station and heater means supported by said support structure within the glass treatment station for heating said glass sheet, said heater means comprising a multi-planar heating surface subdivided into a plurality of heating zones and control means for controlling individually the heat output provided by each of said heating zones;
(B) positioning said glass sheet on glass support means for supporting said glass sheet;
(C) causing relative movement of said glass support means and said glass treatment station to expose said glass sheet to said heater means in the glass treatment station, at least a selected one of said heating zones being energized to provide heating for at least a portion of the time during which said glass sheet is exposed thereto; and
(D) causing relative movement of said glass support means and said glass treatment station to terminate exposure of said glass sheet to said heater means.

22. A method of treating a glass sheet to convert said glass sheet from a first condition into a second condition, said method comprising:

(A) providing a processing line comprising a series of glass treatment stations and transport means for transporting said glass sheet along said line, each said glass treatment station comprising a modular support structure mounted therewithin and heater means supported by said support structure for heating said glass sheet;

(B) positioning said glass sheet on glass support means for transporting said glass sheet by said transport means along a path of travel from one to another of said glass treatment stations; wherein each said heater means has a generally convex heating surface subdivided into a plurality of heating zones distributed on at least three substantially flat, non-coplanar surface segments including (a) a central elongate segment extending longitudinally substantially parallel said path of travel, and (b) a pair of elongate side segments, one on either elongate side of said central elongate segment, and control means for controlling individually the heat output provided by each of said heating zones for heating a corresponding zone of said glass sheet; and (C) transporting said glass sheet on said glass support means to, and temporarily holding said glass sheet in, a position in one after another of said glass treatment stations, at least one of said heating zones being energized to provide heating for at least a portion of the time during which said glass sheet is exposed thereto.

23. The method of claim 22 wherein said second condition is a non-flat curvo-planar configuration, said second condition being achieved progressively from an initially flat configuration defining said first condition, in one said glass treatment station after another.

24. The method of claim 22 wherein multiple said glass sheets are transported along said path of travel in fixed to each other position, from a position in one said glass treatment station to a position in a next glass treatment station.

25. The method of claim 22 wherein said transport means comprises a walking beam.

26. The method of claim 22 wherein each said modular support structure is positioned above said path of travel.

27. A process of forming a curvo-planar vision unit comprising:

(A) positioning a substantially flat glass sheet on a transportable bending fixture;

(B) then transporting said bending fixture with said glass sheet thereon with substantially continuous movement through a preheating portion of a lehr to preheat said glass sheet to near its forming temperature;

(C) then transporting said bending fixture with said glass sheet thereon in a step-wise fashion sequentially to each of a series of glass bending stations in a glass bending portion of said lehr, in each of which stations said bending fixture with said glass sheet thereon remains for a period of time in fixed position relative a modular radiant heater assembly comprising (a) a modular support structure mounted within the glass bending station, (b) heater means supported by said support structure for heating said glass sheet, said heater means having a generally convex heating surface subdivided into a plurality of heating zones distributed on at least three substantially flat, non-coplanar surface segments including (i) a central, horizontal elongate segment extending longitudinally substantially parallel said path of travel, and (ii) a pair of non-horizontal, elongate side segments, one on either elongate side of said central elongate segment, which side segments converge toward the longitudinal centerline of said modular radiant heater assembly at a narrow, more convex end thereof, and (c) control means for controlling individually the heat output provided by each of said heating zones;

(D) then transporting said bending fixture with said glass sheet thereon having achieved substantially a desired bent configuration, with substantially continuous movement, through an annealing portion of said lehr and therein annealing said glass sheet; and (E) removing said glass sheet from said transportable bending fixture.

28. A glass treating apparatus comprising a modular support structure and heater means supported by said support structure for heating a glass sheet to convert said glass sheet from a first condition into a second condition, said heater means comprising a non-mono-planar heating surface subdivided into a plurality of heating zones and control means for controlling individually the heat output provided by each of said heating zones.

29. The glass treating apparatus of claim 28 wherein said heating surface is substantially smoothly curvo-planar.

30. The glass treating apparatus of claim 29 wherein the shape of the smoothly curvo-planar heating surface is substantially that of a circumferential portion of a truncated cone.

31. A glass treatment station comprising glass support means for at least indirectly supporting a glass sheet within said treatment station, a modular support structure mounted within said glass treatment station and heater means supported by said support structure within said treatment station for heating said glass sheet, said heater means comprising a non-mono-planar heating surface subdivided into a plurality of heating zones and control means for controlling individually the heat output provided by each of said heating zones.

32. The glass treatment station of claim 31 wherein said heating surface is substantially smoothly curvo-planar.

33. A glass treatment line for converting a glass sheet from a first condition into a second condition, said line comprising:

(A) a plurality of glass treatment stations, each comprising (a) glass support means for at least indirectly supporting said glass sheet within said station, (b) a modular support structure mounted within said glass treatment station, and (c) heater means supported by said support structure within said glass treatment station for heating said glass sheet, each said heater means comprising a non-mono-planar heating surface subdivided into a plurality of heating zones and control means for controlling independently of each other the heat output provided by each of said heating zones; and (B) transport means for advancing said glass sheet sequentially from one into another of said plurality of glass treatment stations.

34. The glass treatment line of claim 33 wherein said heating surface is substantially smoothly curvo-planar.

35. A method of treating a glass sheet to convert said glass sheet from a first condition into a second condition, said method comprising:
(A) providing a glass treatment station comprising a modular support structure mounted within said glass treatment station and heater means supported by said support structure within the glass treatment station for heating said glass sheet, said heater means comprising a non-mono-planar heating surface subdivided into a plurality of heating zones and control means for controlling individually the heat output provided by each of said heating zones;
(B) positioning said glass sheet on glass support means for supporting said glass sheet;
(C) causing relative movement of said glass support means and said glass treatment station to expose said glass sheet to said heater means in the glass treatment station, at least a selected one of said heating zones being energized to provide heating for at least a portion of the time during which said glass sheet is exposed thereto; and
(D) causing relative movement of said glass support means and said glass treatment station to terminate exposure of said glass sheet to said heater means.

36. The method of claim 35 wherein said heating surface is substantially smoothly curvo-planar.

* * * * *